(12) United States Patent
Faulkner et al.

(10) Patent No.: US 8,094,918 B2
(45) Date of Patent: Jan. 10, 2012

(54) CHECK AND OTHER ITEM DESIGN FOR REFLECTANCE VALUES DETERMINATION PRIOR TO ITEM MANUFACTURE

(75) Inventors: Bill Faulkner, Waterloo (CA); Dmitri Eidenzon, Waterloo (CA)

(73) Assignee: RDM Corporation, Waterloo, Ontario (CA)

( * ) Notice: Subject to any disclaimer, the term of this patent is extended or adjusted under 35 U.S.C. 154(b) by 699 days.

(21) Appl. No.: 12/260,765

(22) Filed: Oct. 29, 2008

(65) Prior Publication Data
US 2010/0104171 A1   Apr. 29, 2010

(51) Int. Cl.
*G06K 9/46* (2006.01)
(52) U.S. Cl. ......... 382/137; 382/139; 382/140; 358/464
(58) Field of Classification Search .................. 382/137, 382/138, 139, 140, 112, 135; 358/462, 463, 358/464; 705/44, 45
See application file for complete search history.

(56) References Cited

U.S. PATENT DOCUMENTS

| | | | |
|---|---|---|---|
| 5,295,196 A * | 3/1994 | Raterman et al. | 382/135 |
| 7,362,891 B2 * | 4/2008 | Jones et al. | 382/135 |
| 2005/0018896 A1 * | 1/2005 | Heit et al. | 382/137 |
| 2007/0241554 A1 * | 10/2007 | Wicker et al. | 283/93 |
| 2008/0062443 A1 * | 3/2008 | Olson | 358/1.9 |
| 2010/0118008 A1 * | 5/2010 | Matsuoka | 345/207 |

* cited by examiner

*Primary Examiner* — Daniel Mariam
*Assistant Examiner* — Nancy Bitar
(74) *Attorney, Agent, or Firm* — Ohlandt, Greeley, Ruggiero & Perle, L.L.P.

(57) ABSTRACT

A system for determining a plurality of reflectance values for an item design representing a physical item having at least one area of interest on a surface of the physical item for containing critical data and a background feature positioned on the surface, the physical item suitable for positioning in a digital image recorder, the system comprising: an input module configured for receiving one or more material reflectance values of a substrate for providing said surface and design parameters for said background feature, the design parameters including a color and a color density of said background feature; a memory configured for storing a plurality of color reflectance values assigned to a corresponding plurality of selected combinations of specified design parameters; a look-up module configured for determining from the memory one or more color reflectance values having the specified design parameters matching the design parameters for said background feature; a combination module configured for combining the one or more material reflectance values with the corresponding one or more color reflectance values to produce resultant one or more design reflectance values representative of the reflectance of physical item when having the background feature positioned on said surface of the substrate; wherein the one or more design reflectance values of the item design are for use in determining whether the design parameters would produce the physical item having an acceptable digital image when processed by the digital image recorder.

21 Claims, 11 Drawing Sheets

ﬁcient in cost and time due to the multiple check versions that

CHECK AND OTHER ITEM DESIGN FOR REFLECTANCE VALUES DETERMINATION PRIOR TO ITEM MANUFACTURE

FIELD OF INVENTION

The present invention relates to item image quality veriﬁcation.

BACKGROUND

The current paper document-processing environment is dependent upon paper processing, which can be inefﬁcient. What is needed is an efﬁcient electronic paper document design process that confirms a paper document design that will be compatible with current electronic capture, storage, and processing system, which are used to alleviate or otherwise mitigate the dependence upon paper form of items such as personal and business checks, for example. Since a vast majority of checks are transported physically via air from one bank to another, and planes can be grounded for a variety of reasons, substantial costs can be incurred by banks due to check processing being delayed. The current system relies upon the physical movement of original paper checks from the bank where the checks are deposited to the bank that pays them, which can be inefﬁcient and costly.

Under current law, a bank may send the original paper check for payment unless it has an electronic payment agreement with the paying bank. Under Check 21 legislation in the United States, by authorizing the use of a new negotiable instrument called a "substitute check" (aka image replacement document), electronic check processing is enabled without mandating that any bank change its current check collection practices. The substitute check is a paper reproduction of an original check that contains an image of the front and back of the original check, which is suitable for automated processing in the same manner as the original check, as long as the check image meets other technical requirements, such as having mandated image quality, otherwise referred to as image readiness.

As a result of Check 21, banks that wish to scan the original paper check to create a substitute check will require it to be "image ready" compatible. Image readiness is the design attributes of a check that ensures optimum recognition of amounts, legibility of handwriting, and reasonably low ﬁle size. Current testing of image readiness procedures uses a scanner to convert a physical check into a binary image, which is then analysed to ensure that the entire check background of the resultant image scan is Check 21 compliant. The testing is performed to ensure minimal background clutter and high background reﬂectance. For example, excessive background clutter causes interference with the legibility of handwritten data and low background reﬂectance causes handwritten data to drop out due to insufﬁcient contrast. Background clutter can consist of offset ink that does not drop out when scanned, which causes the background features of the document to remain in the document image.

Unfortunately, current testing is only used to test compliance of the ﬁnal version of check document designs, which is extremely inefﬁcient since the current design process is heavily manual in nature, requiring the cyclic iteration of offset press setup and printing and then ﬁnal testing of the resultant physical draft check version. In the check design process, design features that are desirable to the naked eye are not always compatible from a imaging quality exhibited by a physical paper document. This manual design process is inefﬁcient in cost and time due to the multiple check versions that must be physically manufactured in order to ﬁnalize a check design that ultimately satisﬁes current image readiness standards.

Current check designs have to be printed and then tested for image readiness in order to conﬁrm how a typical reader/sorter will process the resultant image of the check. If the physical check design is rejected by a reader/sorter, them modiﬁcations are required and the check design is adjusted and a new physical check is printed for image testing. It should be noted that a new plate, for an offset printing process, is created for each new check design, which is considered an expensive and time consuming process. What is needed is a system/method for predicting the image quality of a physical check or other image-ready item before the check of other image ready item is manufactured.

SUMMARY

There is a need for a method and a system for item design that overcomes or otherwise mitigates a disadvantage of the prior art.

Current check designs have to be printed and then tested for image readiness in order to conﬁrm how a typical reader/sorter will process the resultant image of the check. If the physical check design is rejected by a reader/sorter, them modiﬁcations are required and the check design is adjusted and a new physical check is printed for image testing. Contrary to current systems and methods there is provided a system and method for determining a plurality of reﬂectance values for an item design representing a physical item having at least one area of interest on a surface of the physical item for containing critical data and a background feature positioned on the surface, the physical item suitable for positioning in a digital image capturing device, the system comprising: an input module conﬁgured for receiving one or more material reﬂectance values of a substrate for providing said surface and design parameters for said background feature, the design parameters including a color and a print density of said background feature; a memory conﬁgured for storing a plurality of color reﬂectance values assigned to a corresponding plurality of selected combinations of speciﬁed design parameters; a look-up module conﬁgured for determining from the memory one or more color reﬂectance values having the speciﬁed design parameters matching the design parameters for said background feature; a combination module conﬁgured for combining the one or more material reﬂectance values with the corresponding one or more color reﬂectance values to produce resultant one or more design reﬂectance values representative of the reﬂectance of physical item when having the background feature positioned on said surface of the substrate; wherein the one or more design reﬂectance values of the item design are for use in determining whether the design parameters would produce the physical item having an acceptable digital image when processed by the digital image capturing device.

One aspect provided is a system for determining a plurality of reﬂectance values for an item design representing a physical item having at least one area of interest on a surface of the physical item for containing critical data and a background feature positioned on the surface, the physical item suitable for positioning in a digital image capturing device, the system comprising: an input module conﬁgured for receiving one or more material reﬂectance values of a substrate for providing said surface and design parameters for said background feature, the design parameters including a color and a print density of said background feature; a memory conﬁgured for storing a plurality of color reﬂectance values assigned to a corresponding plurality of selected combinations of specified design parameters; a look-up module configured for determining from the memory one or more color reflectance values having the specified design parameters matching the design parameters for said background feature; a combination module configured for combining the one or more material reflectance values with the corresponding one or more color reflectance values to produce resultant one or more design reflectance values representative of the reflectance of physical item when having the background feature positioned on said surface of the substrate; wherein the one or more design reflectance values of the item design are for use in determining whether the design parameters would produce the physical item having an acceptable digital image when processed by the digital image capturing device.

A further aspect provided is a method for determining a plurality of reflectance values for an item design representing a physical item having at least one area of interest on a surface of the physical item for containing critical data and a background feature positioned on the surface, the physical item suitable for positioning in a digital image recorder, the method comprising: receiving one or more material reflectance values of a substrate for providing said surface and design parameters for said background feature, the design parameters including a color and a print density of said background feature; accessing a plurality of color reflectance values assigned to a corresponding plurality of selected combinations of specified design parameters; determining one or more color reflectance values having the specified design parameters matching the design parameters for said background feature; combining the one or more material reflectance values with the corresponding one or more color reflectance values to produce resultant one or more design reflectance values representative of the reflectance of physical item when having the background feature positioned on said surface of the substrate; wherein the one or more design reflectance values of the item design are for use in determining whether the design parameters would produce the physical item having an acceptable digital image when processed by the digital image capturing device.

BRIEF DESCRIPTION OF THE DRAWINGS

These and other features will become more apparent in the following detailed description in which reference is made to the appended drawings by way of example only, wherein.

DESCRIPTION

Items 12

Figure 1:
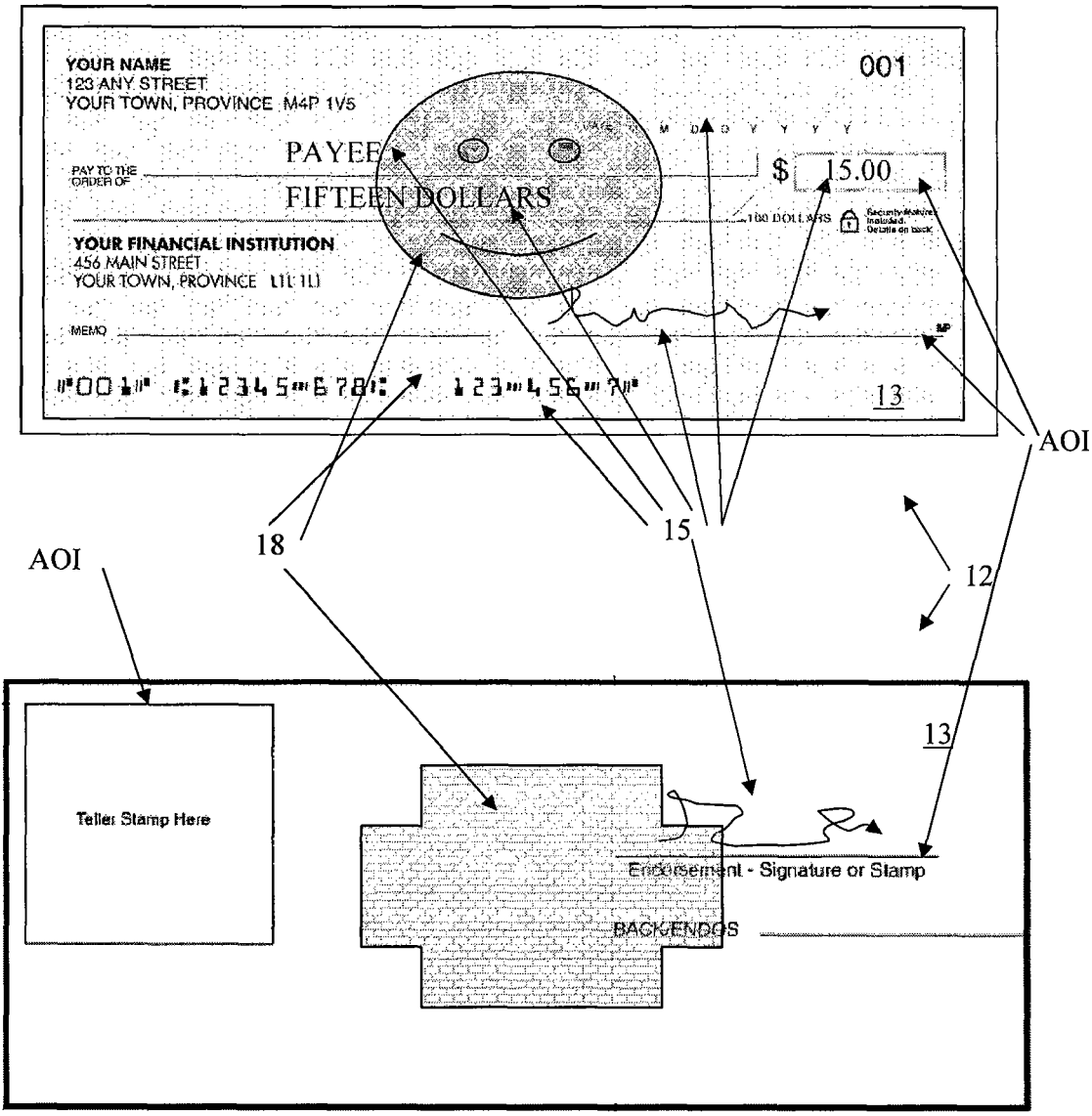
FIG. 1 is an exam item as a check.
Figure 2:
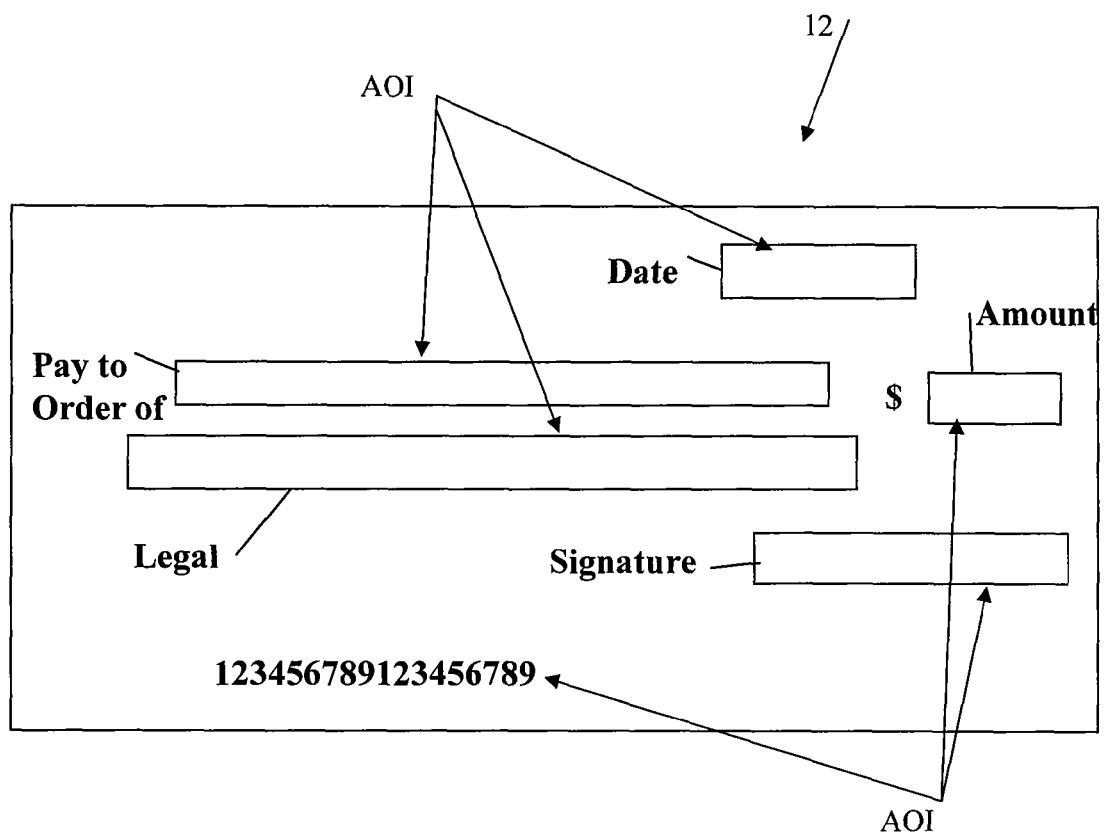
FIG. 2 shows example areas of interest of the item of FIG. 1.
Figure 3:
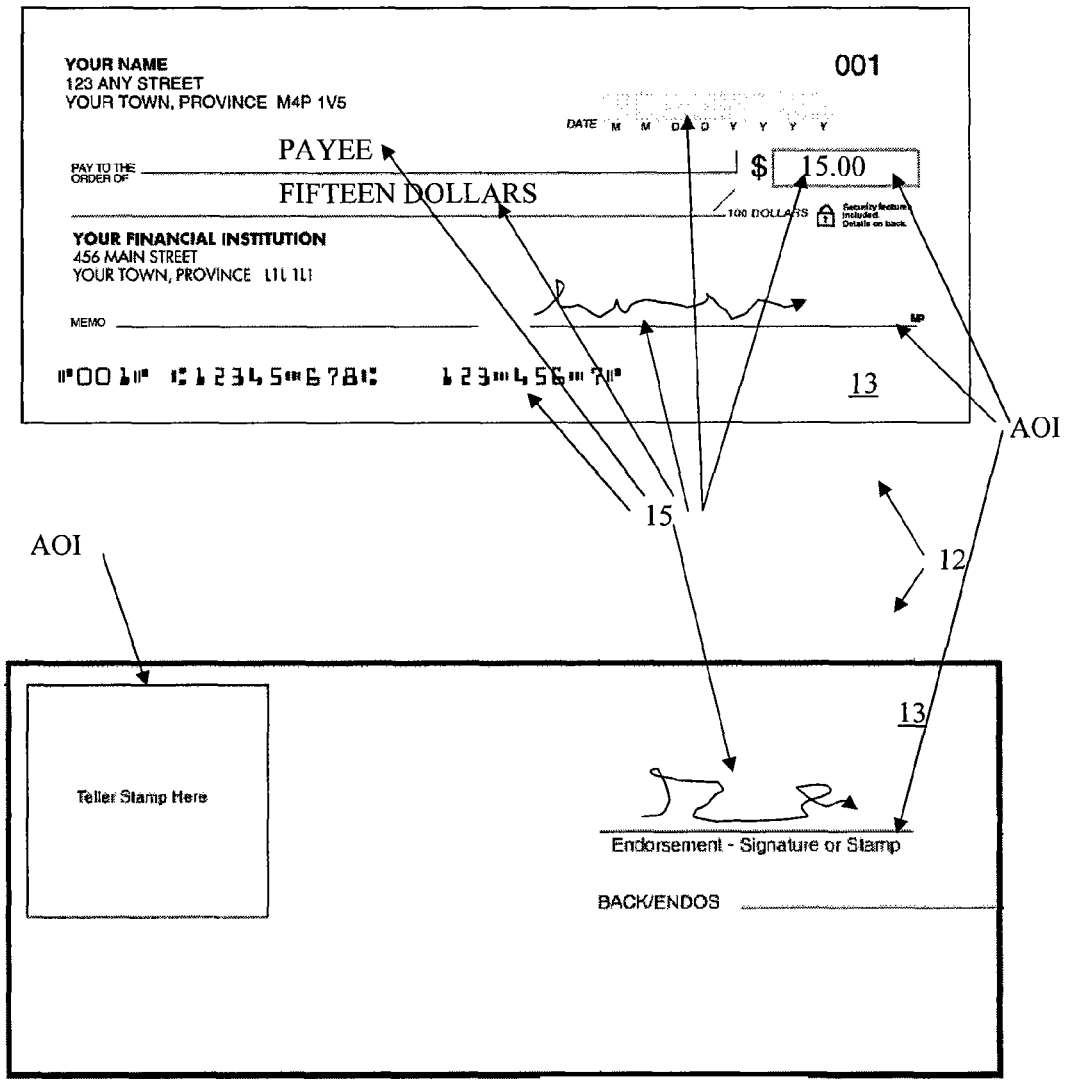
FIG. 3 shows an image of the item of FIG. 1 with background features removed.

Referring to FIG. 1, shown are two example physical items (e.g. checks) 12 having a plurality of areas of interest (AOIs), see FIG. 2, which are considered as the areas on an item surface 13 that contain critical data 15 (e.g. signature) that should be discernable in a recorded digital image 17 of the item surface 13 (see FIG. 3). In the case of where the physical item 12 is a check, the areas of interest AOI are such as but not limited to: Date; Payee; Numerical Amount; Legal Amount (Amount Spelled out); Signature Lines; and the MICR numbering line Area. In general, It is noted that the areas of interest AOI also contain background features 18 (e.g. pictures/images, designs, fill schemes, personal or business logo; font style; color; size and location background features and check fields—e.g. AOIs, etc.). These background features 18 (e.g. design parameters 14 define a plurality of background features 18 positioned on the surface 13) must be designed such that they provide a desirable graphical design appeal of the item surface 13 while at the same time do not occlude or otherwise interfere with the quality of the digital image recording of the critical data 15 located in the areas of interest AOI. It is recognised that the image capturing process of the item surface 13 provides for the conversion of the item surface 13 via scanning and binary conversion (i.e. into a plurality of pixel values) of the critical data 15 (e.g. handwriting) from the areas of interest AOI.

It is recognised that the physical items 12 can be manufactured using a variety of different stock materials 16 (see FIG. 5) such as but not limited to paper, plastic, etc. It is also recognised that the physical items 12 can be embodied as any item that has a requirement for image quality of selected areas (e.g. AOIs) of the item surface 13, such that the selected area(s) AOI(s) of an image 17 (e.g. scanned), see FIG. 3, of the physical item 12 satisfy specified reflectance threshold(s) 20 (see FIG. 5). Examples of the physical items 12 are such as but not limited to: checks; coupons; forms; credit cards; debit cards; loyalty/reward cards; and other items 12 suitable for having the image 17 (e.g. a grey scale image converted to a binary image) captured of the item surface 13 (e.g. front side and/or backside of the physical item 12).

Referring to FIG. 2, shown are example areas of interest AOI for a check embodiment of the physical item 12, as discussed above. It is also recognised that the areas of interest AOI for a credit and/or debit card can be areas such as but not limited to: signature region, card number, visible biometric information; other visible security feature positioned on item surface 13; logo or other visible icon(s); etc. Referring to FIG. 3, shown is the digital image 17 of the physical item 12 of FIG. 1, such that the background features 18 (see FIG. 1) have not occluded the critical data 15 resident in the areas of interest AOI.

Reflectance

Low background reflectance causes low contrast and unintended dropout of vital information (e.g. critical data 15), while high contrast background patterns 18 cause random background clutter to remain in the binary images 17 that renders critical data 15 (e.g. handwriting) ambiguous at best.

Currently in the art, background clutter can be measured by creating the image 17 of the physical item 12 (e.g. without any critical data 15 input into the blank AOIs) that contains the AOIs, then converting the image 17 from gray scale to black-and-white (e.g. a binary image) using a standardized conversion process as is known in the art, and then measuring the clusters of black pixels (paxel count) which remain after conversion.

As part of standardized image 17 quality for physical items 12, specifically the requirements (e.g. ANSI) focus on the areas of interest AOI for background drop out, such that the background features 18 will not occlude or otherwise adversely affect the image quality of the critical data 15 resident in the areas of interest AOI. For example, in standardized image quality testing for physical items 12, this testing is done by measuring a paxel 21 count in a predetermined area, see FIG. 4, in order to determine the legibility of handwritten data or other critical data 15. The paxel 21 can be defined as "a group of dark (e.g. black in the case of grey scale images 17) pixels 23 in a binary image 17 measuring a certain specified dimension (e.g. 0.010"×0.010" square), which is the smallest dark area of background clutter caused by visual interference of the critical data 15 with the background features 18 in the image 17 considered to affect the legibility of the critical data 15 of the physical items 12 when scanned. A related term, "paxel 21 count" refers to the number of contiguous paxels 21 that, when joined in any shape, line or combination (e.g. string 22) can create a background clutter problem to affect the legibility of critical data 15 on the image 17. A standard definition for a paxel is a group of black pixels (equal to or more than 6 of 9) in a binary image, measuring 0.010 inch×0.010 inch (0.25 mm×0.25 mm) square, that is the smallest dark area of background clutter that has been determined to affect the legibility of handwritten data on checks.

Figure 4:
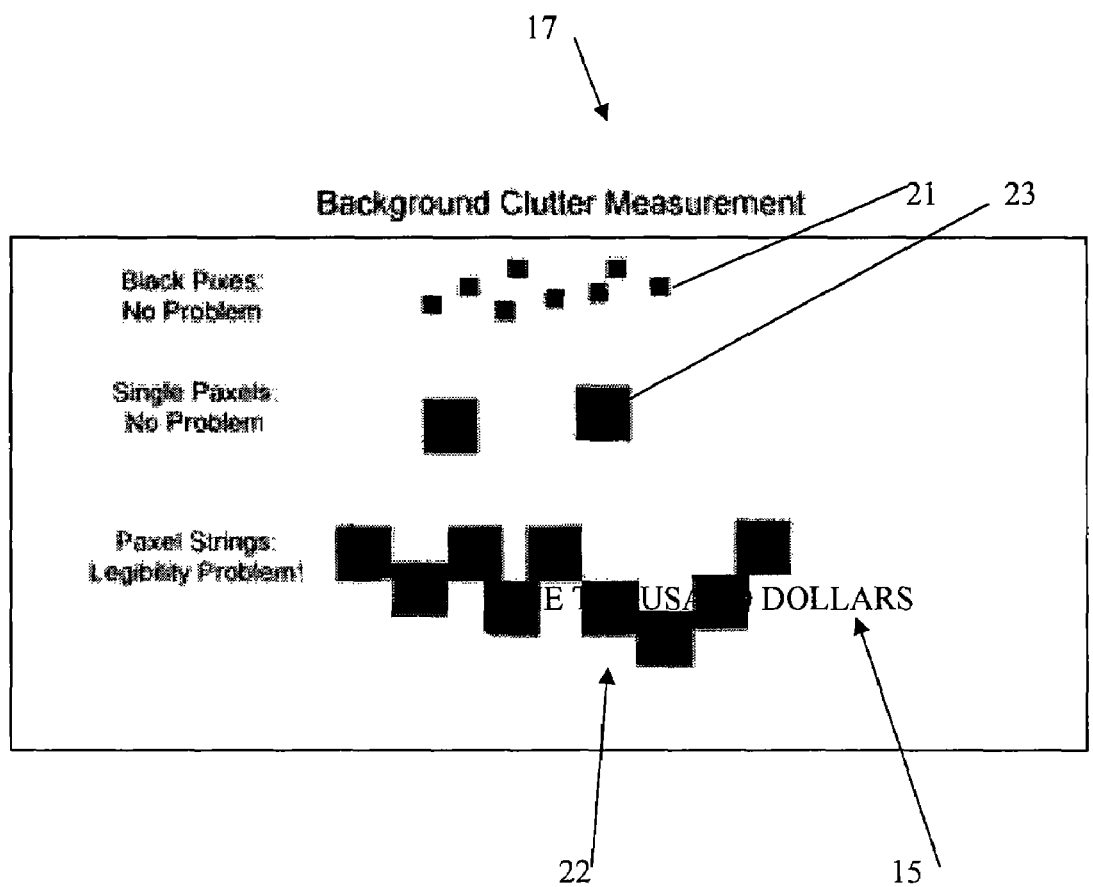
FIG. 4 shows example occlusion of critical data as a result of reflectance inteRberence between the critical data and background features on the item surface.

As mentioned above, the paxels 23 are formed in the image 17 through reflectance interference between the background features 18 and/or the item material 16 and the critical data 15 in the areas of interest AOI, as further described below. It is considered that the critical data 15 on the surface 13 of the physical item 12 should show up in the image 17 as darker that the surrounding background features 18 that may overlap the areas of interest AOI. In cases where the background features 18 have a reflectance value that is considered above the specified reflectance threshold 20 (see FIG. 6), any overlap of these background features 18 and the critical data 15 on the item surface 13 could result in visual occlusion/interference of the critical data 15 in the digital image 17 through formation of dark (e.g. black) pixels 21, paxels 23, and/or paxel strings/combinations 22 in the image 17 that make it difficult for manual (by person) and/or automatic (e.g. OCR) recognition/identification/detection of the critical data 15 from the image 17. An example of this visual occlusion/interference of critical data 15 by paxels 23 is shown in FIG. 4, such that the occluded critical data 15 should read "ONE THOUSAND DOLLARS".

One example of the paxel 21 is a 0.01" by 0.01" block of black pixels 23 (e.g. an example smallest area of a physical document/item 12 considered in capturing the electronic image 17). The paxel 21 (e.g. a grouping of pixels 23) has to be complete (e.g. 66%), or at least a specified number of pixels 23 (e.g. 6 of 9 pixels 23) in the paxel 22. For example, it has been found that individual pixels 23 may not constitute a legibility problem, but 0.01" by 0.01" blocks of problematic legibility does, especially when joined together in the string 22 of paxels 21, see FIG. 4.

Figure 5:
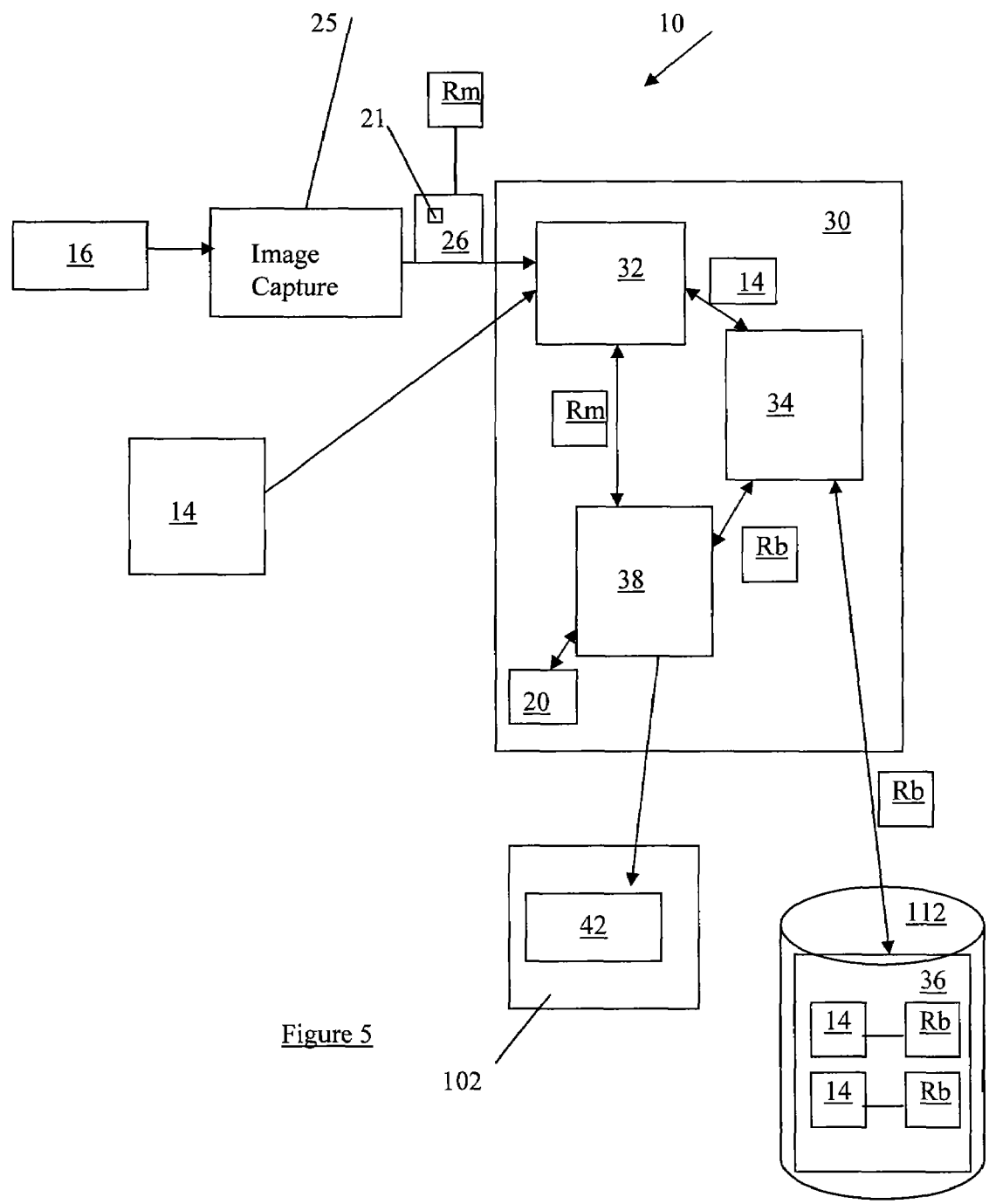
FIG. 5 shows an example item design environment.
Figure 6:
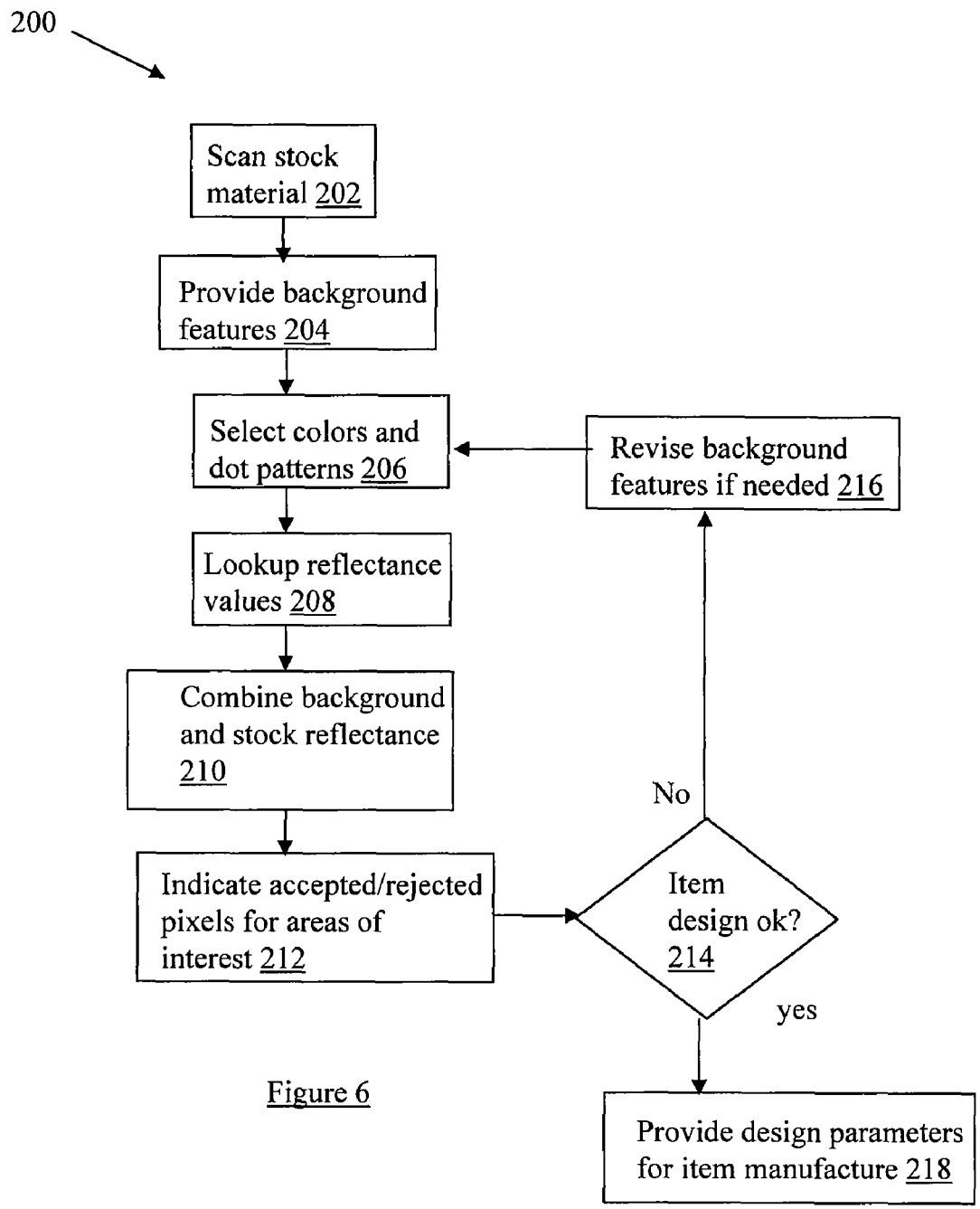
FIG. 6 shows a block diagram of an example operation of the item design environment of FIG. 5.
Figure 7:
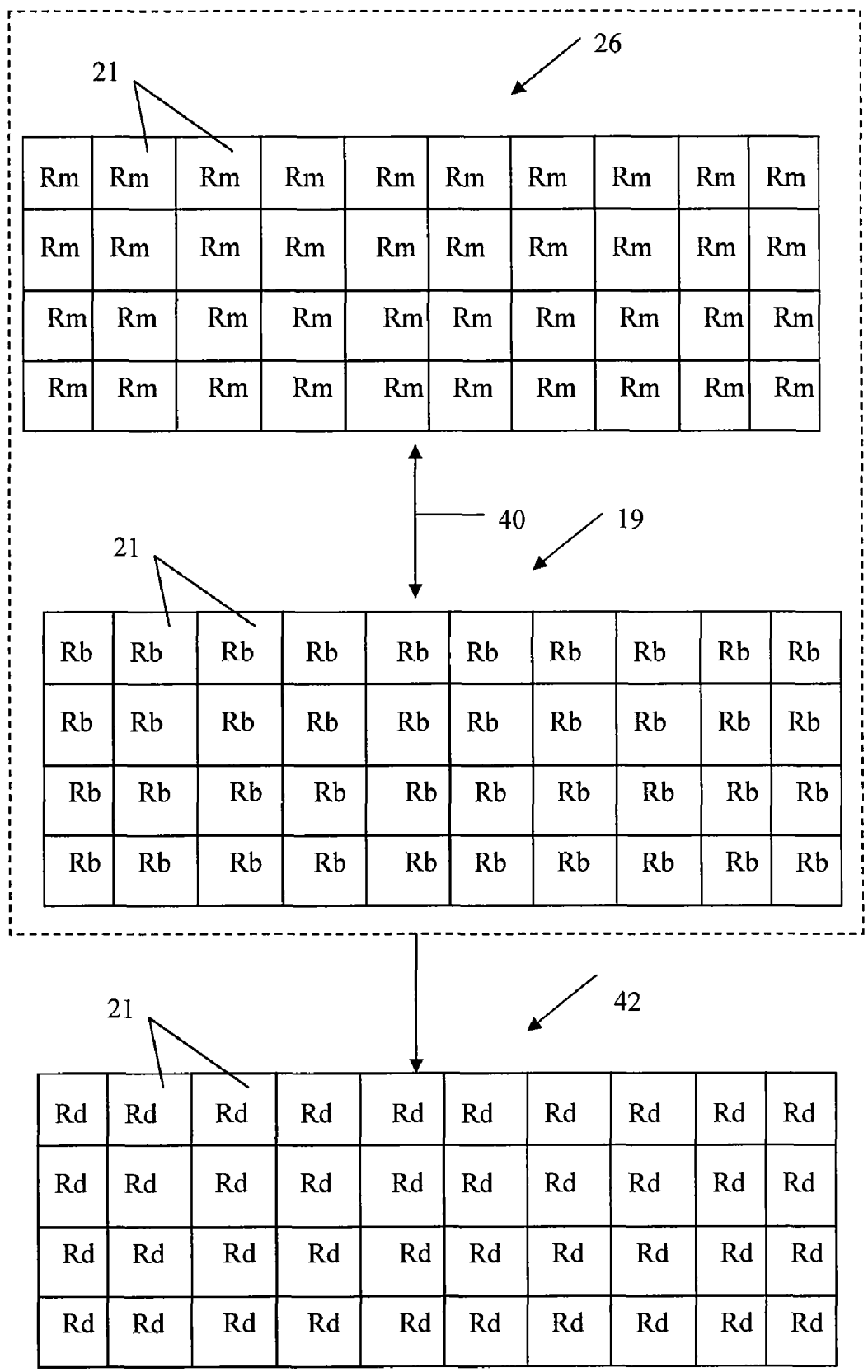
FIG. 7 shows an example combination of reflectance values for the design environment of FIG. 5.

On the contrary to current systems the image-based measuring process 200 of FIG. 6 is configured to determine for a virtual digital design of the background features 18 (e.g. digital design image 19—see FIGS. 5,7) for items 12, which colours, dot/line patterns, and/or ink types are causing low background reflectance and background clutter, down to the pixel 21 level (or grouping 21) of the image 19, so that the check designer can rearrange graphic features or modify the background features 18 for compliance of the design (e.g. represented by the design parameters 14) of the design image 19 before sending the resultant item design parameters 14 to the item manufacturer (e.g. printer in the case of checks, coupons, forms) for manufacture of the physical item 12. Accordingly, the system 10 can be used to predict whether the physical item 12, when imaged, will be in compliance with item reflectance standards (e.g. reflectance is at and/or below/below specified reflectance threshold(s) 20—see FIG. 5) before manufacture of the respective physical item 12.

It is recognised that any pixels 21 or grouping of pixels (e.g. paxels 23) that have a calculated (e.g. predicted) reflectance value below the specified reflectance threshold(s) 20, these pixels 21 or grouping of pixels could be prone to forming the black pixels 21 or grouping of pixels 22,23 (see FIG. 4) if the image 17 was created from the respective manufactured physical item 12. In other words, those portions 21 of a resultant item design 42 (see FIG. 7) that have reflectance values that satisfy the specified reflectance threshold(s) 20 can be considered by the item 12 designer as having design parameters 14 that would inhibit adverse image quality of critical data 15 in the recorded digital image 17 of the surface 13 of the physical item 12.

Reflectance can be defined as the amount of light reflected from each particular marking/indication (e.g. background feature 18) that would be present on the surface 13 of the manufactured physical item 12. For example, for checks 12, the amount of light is reflected from each particular marking sample of paper and/or ink. An example reflectance scale is a range of 0% to 100%, where 0% is absolute black (considered the darkest colour/shade) and 100% is maximum diffuse reflectance of the entire incident light (considered the lightest colour/shade). For example, the ANSI standard for physical check items 12 (e.g. reflectance threshold 20) for reflectance is specified at not less than 40% in all areas of interest AOI with the exception of the convenience amount area (i.e. CAR which contains the numerical amount), which is not less than 60%. If the background features 18 are recorded in the image 17 of the physical item 12 as too dark (i.e. background reflectance is too low as being below the specified reflectance threshold 20), the critical data 15 could drop out (e.g. be occluded) due to insufficient contrast between the overlapping background features 18 and critical data 15 in the image 17 taken of the physical item 12. The Convenience Amount Recognition (CAR), which is the numerical amount area AOI shown in FIG. 1. It is critical that the banks can read the CAR rectangle and its corresponding print contrast signal (PCS) to assure the printed rectangle dropped out and did not interfere with automatic machine recognition of handwritten amounts in bank imaging equipment (not shown). One example of a reflectance threshold 20 is reflectance specified as "not less than 40%", averaging all pixels in all possible ⅛" square areas, such that the background clutter allowed on a selected AOI is specified as a "maximum paxel count of 12".

Design System 10

It is the purpose of the system 10 (see FIG. 5) to determine is any of the pixels 21 of the virtual item image 19 (see FIG. 7) would have reflectance values below or above the specified reflectance threshold(s) 20 before the corresponding design parameters 14 are used to manufacture the respective physical item 12. In other words, those portions 21 of the resultant item design 42 (see FIG. 7) that have reflectance values Rd that satisfy (e.g. above, meaning that the portions 21 have an acceptable reflectance value that would not result in the background feature(e) 18 remaining in the resultant binary image 17 of the physical item 12) the specified reflectance threshold(s) 20 can be considered by the item 12 designer as having design parameters 14 that would inhibit adverse image quality of critical data 15 in the recorded digital image 17 of the surface 13 of the physical item 12.

Referring to FIGS. 1 and 5, shown is an item design system 10 for use in designing the background features 18 of the physical item 12 (e.g. check) based on a selected stock material 16 (e.g. paper, plastic, etc.) for the physical item 12 and the selected design, color, and/or dot (e.g. printing) pattern parameters 14 of the background features 18. It is recognised that the surface 13 characteristics (e.g. sheen, texture, etc.) of the stock material 16 can affect/influence the reflectance values Rm of the stock material 16. The color's dot/line pattern of the background features 18 is hereafter referred to as color density for the sake of simplicity.

It is recognised that the placement/position of the background features 18 on the item surface 13 could overlap the areas of interest AOI that are intended to include the critical data 15 (e.g. either to be placed on the physical item surface 13 by a user of the physical item 12 and/or during manufacture of the physical item 12). Examples of the critical data 15 are such as but not limited to: handwritten text/numbers; MICR data; security features; etc. The stock material 16 is considered to be the substrate (e.g. paper, plastic, etc.) upon which the background features 18, critical data 15, and other markings will be placed, in order to provide the physical item 12.

Referring again to FIG. 5, the design system 10 includes example stock material 16 for feeding into a digital image capturing device 25 (e.g. scanner, camera, etc.) configured to record a reference digital image 26 of the stock material 16. The image device 25 (e.g. digital image recorder) illuminates all of the areas of the stock material 16 by a light source (not shown) and a detector (not shown) measures the intensity distribution of the light reflected by the illuminated areas of the stock material 16. The reflectance of the stock material 16 depends on the amount of absorption and the scattering of the light from the surface of the stock material 16, as measured by the image device 25. The reference digital image 26 is used to provide the reflectance values Rm assigned to each of the pixels 21 (or group of pixels 21—see FIG. 7) of the reference digital image 26. It is recognised that the reflectance value Rm for each of the pixels 21 of the reference digital image 26 can be an average (e.g. each pixel 21 of the reference digital image 26 can have the same reflectance value Rm assigned) of the overall reflectance value of the entire surface 13 of the stock material 16, as desired. Otherwise, the assigned reflectance value Rm of the stock material 16 can be for each specified portion 21 (e.g. a pixel 21 or grouping of pixels 21) defined for the surface 13 of the stock material 16, such that a plurality of the portions 21 make up the surface 13 of the reference image 26.

For example each portion 21 can be a specified size (e.g. such as ⅛ inches square) and therefore the reflectance value Rm of each of the portions 21 of the surface 13 could be the average of the reflectance values Rm for each of the pixels 21 determined in the portions 21 (e.g. all possible ⅛" square areas—as the ⅛ inch aperture as specified by the ANSI, CPA standards.). As such, it is recognised that the reference digital image 26 can have one or more reflectance values Rm (e.g. the same or different Rm values) assigned to different portions 21 of the surface 13 of the reference digital image 26. For the sake of clarity, the terms pixels 21, group of pixels 21, and portions 21 of the surface 13 of the reference digital image 26 are interchangeable. The stock material 16 is intended to be composed of the same material to be used in manufacture if the physical item 12, once designed, and the image device 25 can be representative of the reader/sorters used in processing of the physical items 12. It is recognised that the reflectance Rm values of the stock material 26 can be influenced by lighting conditions of the image device 25, colour of the surface 13 of the stock material 16, surface 13 texture of the stock material 16, etc.)

The reference image 26 and the design parameters 14 of the item 12 are provided by a designer to an input module 32 of a reflectance engine 30. The design parameters 14 can have background features 18 data such as but not limited to: feature 18 size; feature 18 shape; feature 18 location on surface 13; feature 18 colour; feature 18 ink type; feature 18 dot/line pattern (e.g. a series/collection of dots or other shaped depositions of ink that make up a printed image of the respective feature—also referred to as color density, screen density, or print density); etc. For example, for printers, the dot pattern that is used to make the graphic image of the background feature 18 can be referred to as DPI (dots per square inch) specification that indicates the number of dots per inch that the printer is capable of achieving to form text or graphics on the surface of the manufactured physical item 12. The higher the DPI (e.g. the higher the color density), the more refined the text or image will appear on the surface 13 (e.g. the more solid, filled in the text/image of the background feature 18 will appear to the naked eye). For example, for background features 18, it is common to use a lower DPI to give the appearance of a translucent image nature of the background feature 18 as compared to the critical data 15. It is recognised that the term color can be defined as the visual sensation dependent on the reflection or absorption of light from a given surface 13 (e.g. of the physical item 12, of the surface 13 of the image 19, the item design 42 represented on the user interface 102, etc.), such that hue (the quality of a color as determined by its dominant wavelength), value (relative darkness or lightness of a color), and/or intensity (the saturation, strength, or purity of a color) can be characteristics of the color.

Referring again to FIG. 5, the reflectance engine 30 also has a lookup module 34 that is configured for determining a reflectance value Rb (e.g. a color reflectance value) for each of the pixels 21 (or grouping of pixels 21) of each of the background features 18 that are defined in the design parameters 14. For example, the lookup module 34 determines the color, shade, dot pattern, ink type, and/or any other design parameter 14 for each of the pixels 21 or grouping of pixels 21 to be located on the surface 13 of the virtual design image 19 (see FIG. 7—note, not to scale). These reflectance values Rb are stored in a reflectance table 36 (e.g. a memory store) that is accessible by the lookup module 34 in a digital memory 112, such that a reflectance value Rb is specified for each single parameter and/or parameter combination of the design parameters 14. For example, in the table 36, a reflectance value Rb could be associated with each color. Accordingly, the lookup module assigns a reflectance value Rb from the lookup table 36 for each of the pixels 21 or grouping of pixels 21 of the surface 13 of the design image 19 that contains at least a portion of the background feature(s) 18 defined in the design parameters 14. Different colors (in the design parameters 14 for the background features 18) are specified in the table 36 and the design parameters 14 using one or more known color chart(s) (e.g. PMS color chart of the Pantone™ Matching System), such that the colors specified in the design parameters 14 can be matched to corresponding colors in the table 36. As such, it is recognised that the background features 18 of the design image 19 can have one or more reflectance values Rb (e.g. the same or different Rb values) assigned to different portions 21 of the background features 18 of the design image 19. For the sake of clarity, the terms pixels 21, group of pixels 21, and portions 21 of the background features 18 in the design image 19 are considered interchangeable.

Referring again to FIG. 5, the reflectance engine 30 also has a combination module 38 that obtains the reflectance values Rm for each of the portions 21 of the reference image 26 of the stock material 16 and reflectance values Rb of the background feature(s) 18 that correspond to each of the portions 21 of the design image 19. The combination module 38 combines 40 (see FIG. 7) the reflectance values Rm with the reflectance values Rb for each of the corresponding portions 21 of the reference 26 and design 19 images in order to produce a plurality of combined reflectance values Rd, representing reflectance values for the item design 42. For example, the item design 42 includes the series of design parameters 14 used in the determination of the reflectance values Rd, as well as the specification of the stock material 16. The item design 42 can be presented on a user interface 102 (e.g. a display) for subsequent review by the item designer.

Further optional configurations of the combination module 38 include functionality such as but not limited to: indicating those portions 21 of the item design 42 that do not satisfy the reflectance threshold(s) 20 by comparing (for example, this functionality of comparison can be performed by a comparison module as a sub-module of the combination module 38 or as a separate module, as desired) each of the determined reflectance values Rd to the corresponding reflectance threshold 20 for the respective areas of interest AOI; automatically changing the dot/line pattern specified in the design parameters 14 for those background feature(s) 18 that contain portions 21 that do not satisfy the reflectance threshold(s) 20 in order to produce acceptable reflectance values Rd before presentation of the item design 42 to the designer via the user interface 102; suggesting changes via the user interface 102 to the dot/line pattern specified in the design parameters 14 for those background feature(s) 18 that contain portions 21 that do not satisfy the reflectance threshold(s) 20 in order to produce acceptable reflectance values Rd after presentation of the item design 42 to the designer via the user interface 102; automatically changing the color and/or shade specified in the design parameters 14 for those background feature(s) 18 that contain portions 21 that do not satisfy the reflectance threshold(s) 20 in order to produce acceptable reflectance values Rd before presentation of the item design 42 to the designer via the user interface 102; suggesting changes via the user interface 102 to the color and/or shade specified in the design parameters 14 for those background feature(s) 18 that contain portions 21 that do not satisfy the reflectance threshold(s) 20 in order to produce acceptable reflectance values Rd after presentation of the item design 42 to the designer via the user interface 102; and/or automatically or otherwise suggest changes to the stock material 16 in order to correct those reflectance values Rd that do not satisfy the reflectance threshold(s) 20.

Example Determination of Reflectance Values Rd of the Design Image 19

Figure 9:
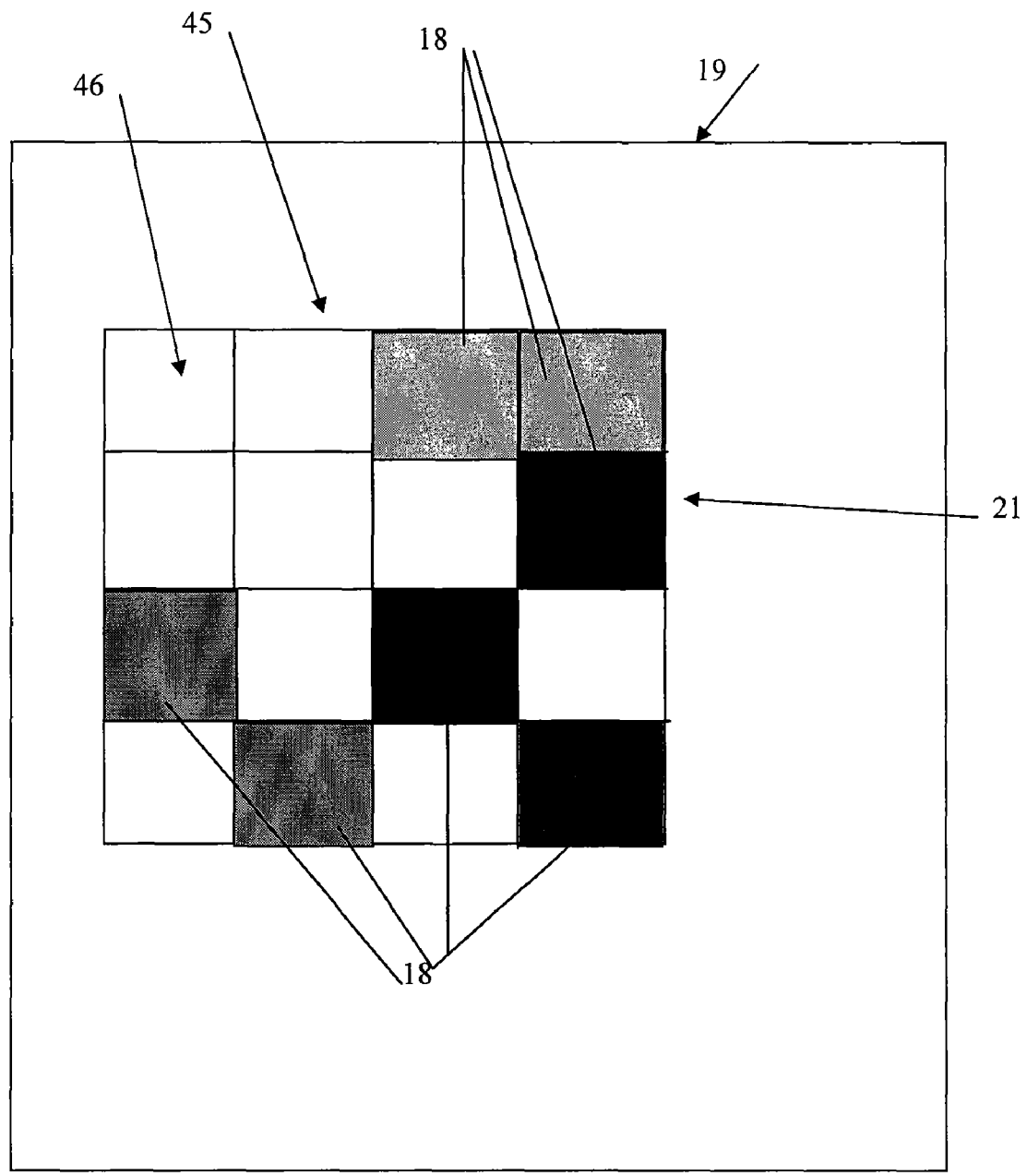
FIG. 9 shows an example portion of an assigned reflectance map for the design image of FIG. 1.

Referring to FIG. 9, shown is an example of the design image 19 (not to scale) having an example portion 21 containing individual pixels 45 having background features 18, see FIG. 1, (e.g. containing same/different colors having one or more shades—e.g. according to a single colour scale such as but not limited to grey scale) and individual pixels 46 having no background features 18 present (e.g. considered as will only contain the relative blank/white space of the stock material 16). For example, the colours of the background features 18 present design image 19 can all be converted to a representative shade in a single colour scale (e.g. grey, brown, red, etc. scale) for use in determination of the colours respective reflectance value Rb from the table 36 (see FIG. 6). For example, the single colour scale can be a grey scale having 256 shades of grey, which are then used as a basis for conversion of the design image 19 into the binary image (e.g. black or white) of the resultant image 17 that would be obtained from the physical item 12 having the background features 18 of the resultant item design 42, further described below. The determined reflectance Rb, Rm distribution of all of the plurality of pixels 45, 46 in the design image 19 can be referred to as a reflectance map, for example. Further, it is recognised that the reflectance map can be represented in a single and/or multiple colour scales, as desired, such that the reflectance map contains a plurality of reflectance values Rb having a greater resolution (e.g. greater number of potentially different reflectance values Rb—e.g. on a pixel per pixel basis) of the representative surface 13 of the image 19, as compared to the resolution (e.g. number present on the surface 13) of the portions 21 (see FIG. 7). As shown in FIG. 9, the portion 21 contains a subset of the total number of assigned reflectance values Rb in the reflectance map of the image 19. For example, the reflectance vales Rm for the stock material 16 of the design surface 13 are replaced by the assigned reflectance values Rb (as per the parameters 14) where the background features 18 are positioned on the surface 13 of the design image 19, thus providing for a generated reflectance map of the image 19 that consists of portions 21 (e.g. pixels) assigned either a material reflectance value Rm or a colour reflectance value Rb associated (in the table 36) with the specified colour (as per the design parameters 14) of the background feature 18. It is recognised that the individual reflectance values of the reflectance map can be modified/adjusted, as further discussed below, to account for anticipated deviations of the reflectance values from the defined Rb and Rm values, due to actual bleed-through and/or diffusion of colours between adjacent pixels (and/or between the back side and the front side) when the background features 18 are printed on the physical item 12.

In the case for the selected portion 21 of FIG. 9, there are pixels 45 (e.g. two) of a first lighter colour (e.g. light grey of a grey scale), pixels 45 of a second medium colour (e.g. medium grey of a grey scale that are darker than the first colour), and pixels 45 (e.g. three) of a third darker colour (e.g. dark grey of a grey scale that are darker that the first and second colours), and nine pixels 46 that do not contain any background features 18 (see FIG. 1). Accordingly, the reflectance engine 30 assigns a first reflectance value (e.g. Rb1) to each of the two pixels 45 of the first colour, a second reflectance value (e.g. Rb2) to each of the two pixels 45 of the second colour, a third reflectance value (e.g. Rb2) to each of the three pixels 45 of the third colour, and the material reflectance value Rm to each of the remaining pixels 46 with absent background features 18. For example, it is recognised that the third reflectance value Rb3 is lower than the second reflectance value Rb2 which is lower than the first reflectance value Rb1, in the case where the first colour is the relative lightest and the second colour is the relative darkest (e.g. in terms of the single colour scale). It is also recognised that the material reflectance value(s) Rm are assigned to the pixels 46, such that the material reflectance value(s) Rm can be higher than any of the reflectance values Rb1,2,3 of the background features 18.

Referring again to FIGS. 7 and 9, the reflectance engine 30 then determines a representative reflectance value Rd as a combination (e.g. average) of all of the reflectance values Rb,Rm of the pixels 45,46 present in the portion 21. For example, in the case of FIG. 9, the reflectance value can be calculates as Rd=(9*Rm+2*Rb1+2*Rb2+3*Rb3)/16. It is recognised that the calculation for the representative reflectance value Rd of the selected portion 21 can be an average, a weighted average, or any other numerical calculation appropriate for determining the representative reflectance value Rd of the selected portion 21 It is recognised that the pixels of the selected portion 21 can contain only background features 18, background features 18 and representative stock material 16, and/or only representative stock material 16, as per the provided design (e.g. via the design parameters) of the background features 18.

Figure 11:
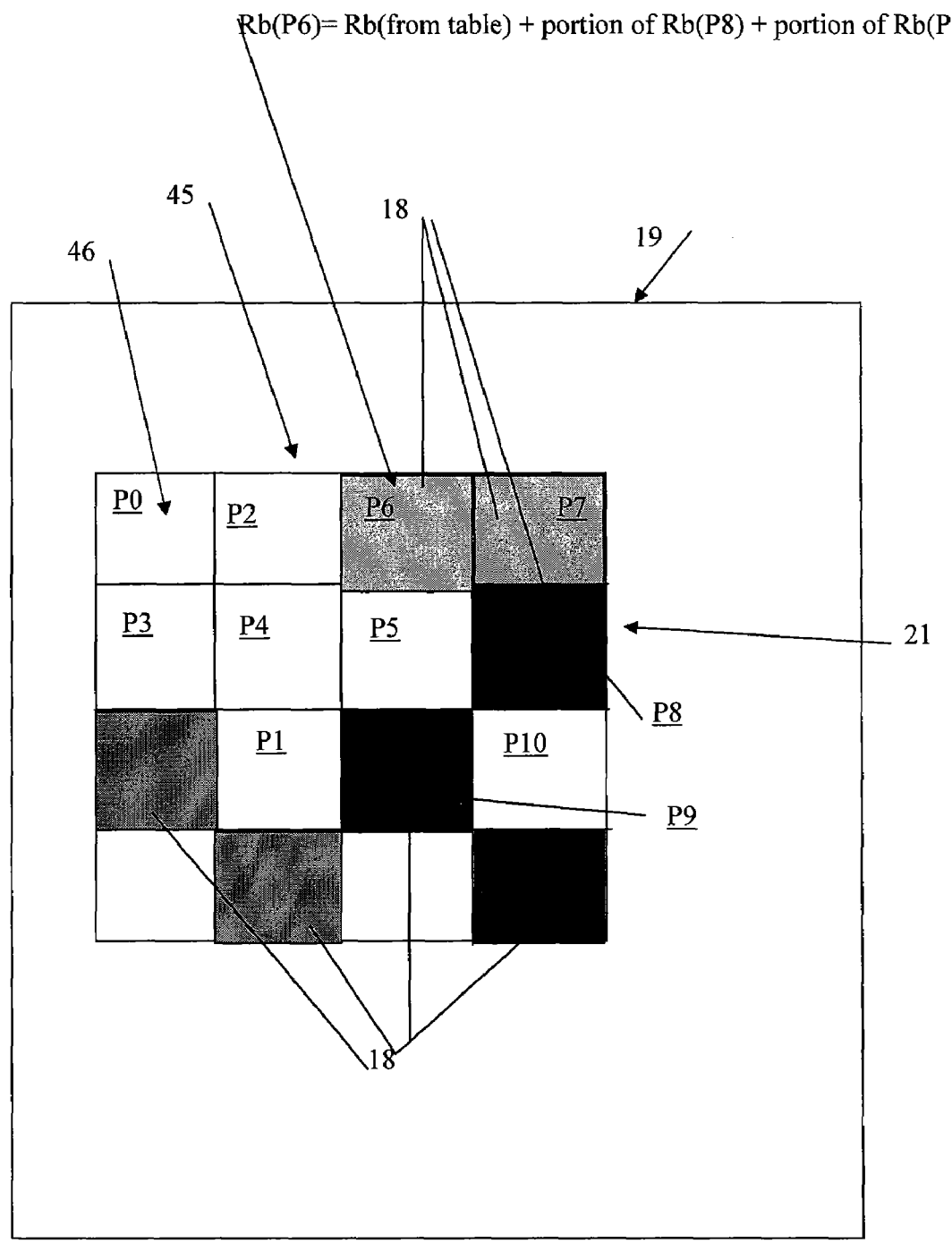
FIG. 11 is an alternative embodiment of the reflectance map of FIG. 9

Referring to FIG. 11, shown is an alternative embodiment to the reflectance map shown for the portion 21 of FIG. 9. Each of the adjacent pixels 45,46 of a pixel can be used to adjust the anticipated actual reflectance value of the pixel when the background feature 18 is physically printed on the surface 13 of the stock material 16 to produce the physical item 12. For example, loss of edge definition of the pixel 45, 46 at the edge of pixel 45, 46 can be caused by the ink from adjacent shaded and/or solid fill areas, diffusing into the periphery of the pixel, e.g. colour from an adjacent pixel 45 (or series of adjacent pixels 45) will bleed in or otherwise diffuse into the adjacent blank pixel 46, or colour from an adjacent pixel 45 (or series of adjacent pixels 45) will bleed in or otherwise diffuse into the adjacent coloured pixel 45. Further, for example, when paper (e.g. material 16) is too thin or the ink applied too heavily, the color of the background feature 18 can bleed or seep through to the other side/surface 13 (e.g. from the front side to the back side) of the item 12. This can be referred to as bleed-through. This bleed through and/or diffusion of colour from one pixel into another can be simulated in the reflectance map of the design image 19 by adjusting the assigned reflectance value Rb (as per the table 36 for the designer specified 14 colour) to account for any anticipated bleed-through, diffusion, based on experimental experience. For example, referring to FIG. 7, pixel P0 only has adjacent pixels P2, P3, P4 that are devoid of any background features 18, and as such pixel P0 could remain as having assigned the actual reflectance value Rm of the stock material 16. However, the pixels P2, P3, P4, P5, P6, P7, P8, P9, P10 all have adjacent pixels 45,46, some of which that have some degree of colour specified as part of the background features 18. In the case of pixel P6, for example, a certain amount of diffusion of the colour from pixel P7 and pixel P8 can be expected during printing of the actual manufactured item 12.

As such, the reflectance value of the pixel P6, i.e. Rb(P6), can be adjusted as a combination of the reflectance values of the adjacent pixels P2, P4, P5, P7, and P8. For example, in the case where the reflectance values Rb(P2), Rb(P4), Rb(P5) are considered as having Rb=100 (e.g. true white), the reflectance value Rb(P6) would be modified (e.g. decreased) by an adjustment factor Radjust (over the theoretical reflectance value Rb present in the table 36 associated with the colour present in the pixel P6) based on the reflectance values Rb of the colours in pixels P7 and P8 only. The degree of adjustment of the reflectance value Rb(P6) can depend on amount of exposure of the pixel P6 to the adjacent pixels P7,P8 (e.g. P8 is at an adjacent corner to P6 while P7 is at an adjacent side to P6), such that adjacent corner pixels may have a lower degree of influence on the reflectance adjustment as compared to adjacent side pixels, for example in the case where the colour is the same for each of the adjacent side and corner pixels). In the present case of FIG. 11, pixel P6 would have the reflectance value from the table 36 (e.g. Rb(P6) modified by an adjustment factor Radjust, as a combination of the reflectance values of adjacent pixels P7 and P8 (e.g. a weighted combination where the weighted value of the reflectance Rb of pixel P8 is less than the weighted value of the reflectance Rb of the pixel P7). Similarly, the reflectance values Rb of the other pixels 45,46 would be modified based on the reflectance values Rb of their adjacent pixels 45,46. In the case where the pixel 45,46 is surrounded by pixels 45,46 of similar reflectance value Rb, the adjustment factor Radjust may be negligible/non-existent.

Accordingly, it is recognised that the assigned reflectance values Rb of the reflectance map of the image can be adjusted by an adjustment factor to account for colour interference (e.g. diffusion, bleed-through, etc.) from adjacent pixels. It is also recognised that the resolution of the reflectance map can be defined on a pixel-per-pixel basis and/or on a grouping of pixels-per-pixels basis (e.g. the same reflectance value Rb is assigned to a group of pixels).

Example Reflectance Values Rb associated with parameters 14 (e.g. colours) in the Table 36

For example, the following equation can be used to generate the table 36 (see FIG. 5) with its association of reflectance value Rb with each of the colours (e.g. L*) present in the table 36. It is recognised that each of the colours in the table are specified according to a predefined colour scale e.g. CIE Lab).

Compression In Lightness

The relationship between surface reflectance (luminance relative to the luminance of a white standard) and perceived lightness (CIE L* scale; divide L* by 10 to get the Munsell value V) can be given as:

$$L^* = 116*(Yc/Yw)^{1/3} - 16,$$

where Yc is the Y tristimulus value (e.g. reflectance value Rb) for the surface, and Yw is the Y tristimulus value for the white standard (e.g. 100). The power of $^{1/3}$ is the superscript "one third" and represents the cube root of the quantities in parentheses. Here is the formula in excel notation:

$$L^* = 116*(POWER(Yc/100, 1/3)) - 16.$$

Figure 10:
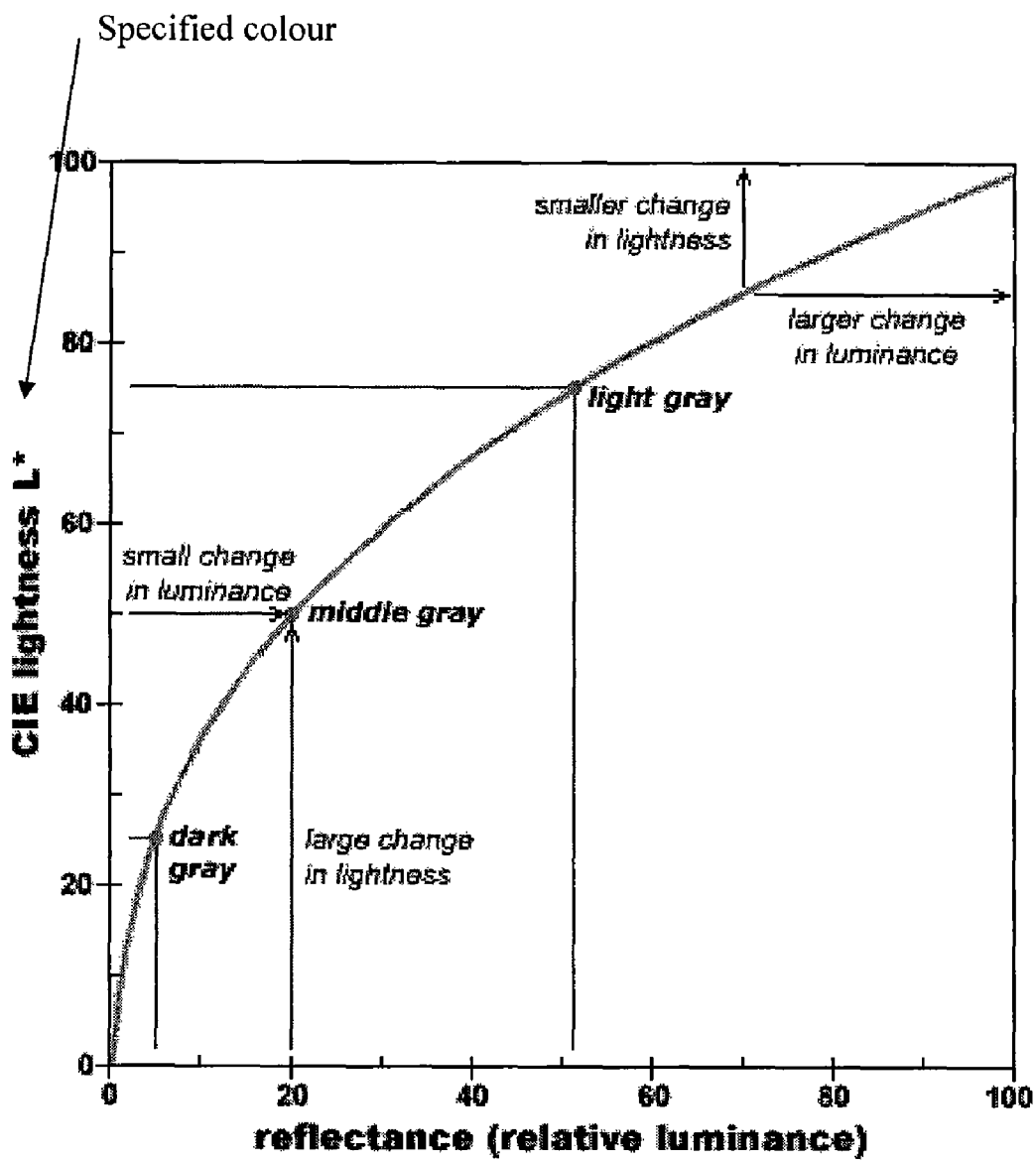
FIG. 10 shows an example relationship between a perceived colour of a colour scale and its corresponding reflectance value for use in determining the assigned reflectance values of the reflectance map of FIG. 9.
Figure 10:
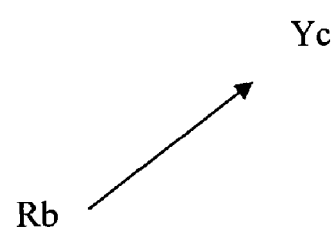

Shown in FIG. 10 is a graphical representation (e.g. CIE Lab to Grayscale—Reflectance) of the above mathematical relationship between the predefined colour L* and its reflectance value Rb, where black would be defined as having a specified L* value of zero and a corresponding reflectance value of zero and white would be defined as having a specified L* value of 100 and a corresponding reflectance value of 100.

It is also recognised that in the event that the specified colour in the design parameters 14 of the background features 18 may be given in a defined colour space other than CIE Lab. In this case, the reflectance engine 30 can perform conversion of the colours in the design parameters 14 from the specified colour space (e.g. RGB) to the colour space used to specify the reflectance values Rb in the table 36. For example, the following colour conversion formulas between colour spaces can be used.

*RGB to CIE XYZ*

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} * \begin{bmatrix} R \\ G \\ B \end{bmatrix}$$

Or $$X = 0.412453*R + 0.357580*G + 0.180423*B$$

$$Y = 0.212671*R + 0.715160*G + 0.072169*B$$

-continued $$Z = 0.019334 * R + 0.119193 * G + 0.950227 * B$$

RGB to CIE Lab

This is the colour space produced on a CRT (or similar) display when pixel values are applied to a graphics card. To convert RGB pixel value is to CIE XYZ tri-stimulus values is a two stage process:

RGB to CIE XYZ to CIE L*a*b*

CIE XYZ to CIE L*a*b*

This is based directly on CIE XYZ (1931) and is another attempt to linearize the perceptibility of unit vector colour differences. Again, it is non-linear, and the conversions are still reversible. Colouring information is referred to the colour of the white point of the system, subscript n. The non-linear relationships for L* a* and b* are the same as for CIELUV and are intended to mimic the logarithmic response of the eye.

$$L^* = 116 * ((Y/Yn)^\wedge(\frac{1}{3})), \text{ for } Y/Yn > 0.008856$$

$$L^* = 903.3 * Y/YN, \text{ for } Y/Yn <= 0.008856$$

$$a^* = 500 * (f(X/Xn) - f(Y/Yn))$$

$$b^* = 200 * (f(Y/Yn) - f(Z/Zn))$$

where $$f(t) = t^\wedge(\frac{1}{3}), \text{ for } t > 0.008856$$

$$f(t) = 7.787 * t + 16/116, \text{ for } t <= 0.008856$$

Again, L* scales from 0 to 100. Again, there are polar parameters that more closely match the visual experience of colours.

$$\text{Chroma } C^* = (a^{*\wedge}2 + b^{*\wedge}2)^\wedge 0.5$$

$$\text{Hue hab} = \arctan(b^*/a)$$

Hue is an angle in four quadrants, and there is no saturation term in this system.

PMS to CMYK & RGB

Note that the conversions in this color codes chart are best described as "nominal". They will produce an invertible conversion between the RGB code and a subset of CMYK; that is, one can take an RGB color code and convert to certain CMYK colors, and from these CMYK colors obtain the matching, original RGB codes. However, conversion of CMYK colors to RGB cannot be reversed; this means, given a CMYK color code which is converted to RGB, performing the former conversion may not give the original CMYK color. In addition, CMYK colors may print differently from how the RGB colors display on a monitor. There is no single "good" conversion rule between RGB and CMYK, because neither RGB nor CMYK is an absolute color space.

White Point

In general, a white point is one of a number of reference illuminants used in colorimetry which serve to define the color "white". Depending on the application, different definitions of white are needed to give acceptable results. For example, photographs taken indoors may be lit by incandescent lights, which are relatively orange compared to daylight. Defining "white" as daylight will give unacceptable results when attempting to color-correct a photograph taken with incandescent lighting.

Each white point illuminant is ideally described as a spectral power distribution, that is, by giving the amount of power per unit wavelength at each wavelength of the visible spectrum. This will allow the coordinates of the white point in any color space to be defined. For example, one of the simplest white points to understand is the "E" or "Equal Energy" white point. Its spectral power distribution is flat, giving the same power per unit wavelength at any wavelength. In terms of the CIE XYZ color space its color coordinates are [K,K,K] where K is a constant, and its chromaticity coordinates are [x,y]= [⅓,⅓].

A list of common white points, their CIE chromaticity coordinates (x,y) and their correlated color temperature (CCT) are given below. The CIE chromaticity coordinates are given for both the 2 degree field of view (1931) and the 10 degree field of view (1964). The color swatches represent the hue of each white point, calculated with brightness Y=0.54, assuming correct sRGB display calibration.

| White points | | | | | | |
|---|---|---|---|---|---|---|
| | CIE 1931 | | CIE 1964 | | CCT | |
| Name | x | y | x | y | °K | Hue Note |
| E | ⅓ | ⅓ | ⅓ | ⅓ | 5400 | Equal energy |
| D50 | 0.34567 | 0.35850 | 0.34773 | 0.35952 | 5000 | |
| D55 | 0.33242 | 0.34743 | 0.33411 | 0.34877 | 5500 | |
| D65 | 0.31271 | 0.32902 | 0.31382 | 0.33100 | 6500 | Television, sRGB color space |
| D75 | 0.29902 | 0.31485 | 0.29968 | 0.31740 | 7500 | |
| A | 0.44757 | 0.40745 | 0.45117 | 0.40594 | 2856 | Incandescent tungsten |
| B | 0.34842 | 0.35161 | 0.3498 | 0.3527 | 4874 | Discontinued |
| C | 0.31006 | 0.31616 | 0.31039 | 0.31905 | 6774 | Discontinued |
| 9300 | 0.28480 | 0.29320 | | | 9300 | Blue phosphor monitors |
| F2 | 0.37207 | 0.37512 | 0.37928 | 0.36723 | 4200 | Cool White Fluorescent |
| F7 | 0.31285 | 0.32918 | 0.31565 | 0.32951 | 6500 | Narrow Band Daylight Fluorescent |

Operation of the System 10

Referring to FIGS. 1, 5 and 6, shown is a process 200 for operating the design system 10 for use in producing the design parameters 14 of the item 12 that is determined as satisfying the reflectance threshold(s) 20 for the selected stock material 16 and the one or more background features 18 positioned on the stock material 16.

Referring to FIG. 6, step 202 of the design process 200 provides (e.g. via the image capturing device 25) one or more reflectance values Rm of the stock material 16 that is used as a substrate for placement of the background features 18 and any critical data thereon. At step 204, the design parameters 14 of the background features 18 are provided, including the position, color and the printing pattern (e.g. dot pattern) 206 of the background feature(s) 18. At step 208, the reflectance engine 30 determines the reflectance values Rb for each portion 21 of the surface 13 of the design image 19 that represents the one or more background feature(s) 18. At step 210, the reflectance engine 30 combines the determined background reflectance values Rb and the stock material reflectance values Rm to produce the resultant item design reflectance values Rd. At step 212, the reflectance values Rd are compared with the appropriate reflectance threshold(s) 20 (e.g. for each of the background features 18 present in the areas of interest AOI of the item 12) to determine those portions 21 of the item design 42 that either satisfy or do not satisfy the reflectance threshold(s) 20. At step 214, in the event that certain portions 21 of the item design 42 have unsatisfactory reflectance values Rd, the design parameters 14 are revised, including the selection 206 of the color(s) characteristics and/or color/print density, and steps 208, 210, 212 are repeated. At step 214, if the item design 42 is considered acceptable (e.g. does not contain a specified number of portions 21 that have reflectance values Rd that do not satisfy the reflectance threshold(s) 20), the list of corresponding design parameters 14 are provided to the designer.

Example of Reflectance Engine 30

Figure 8:
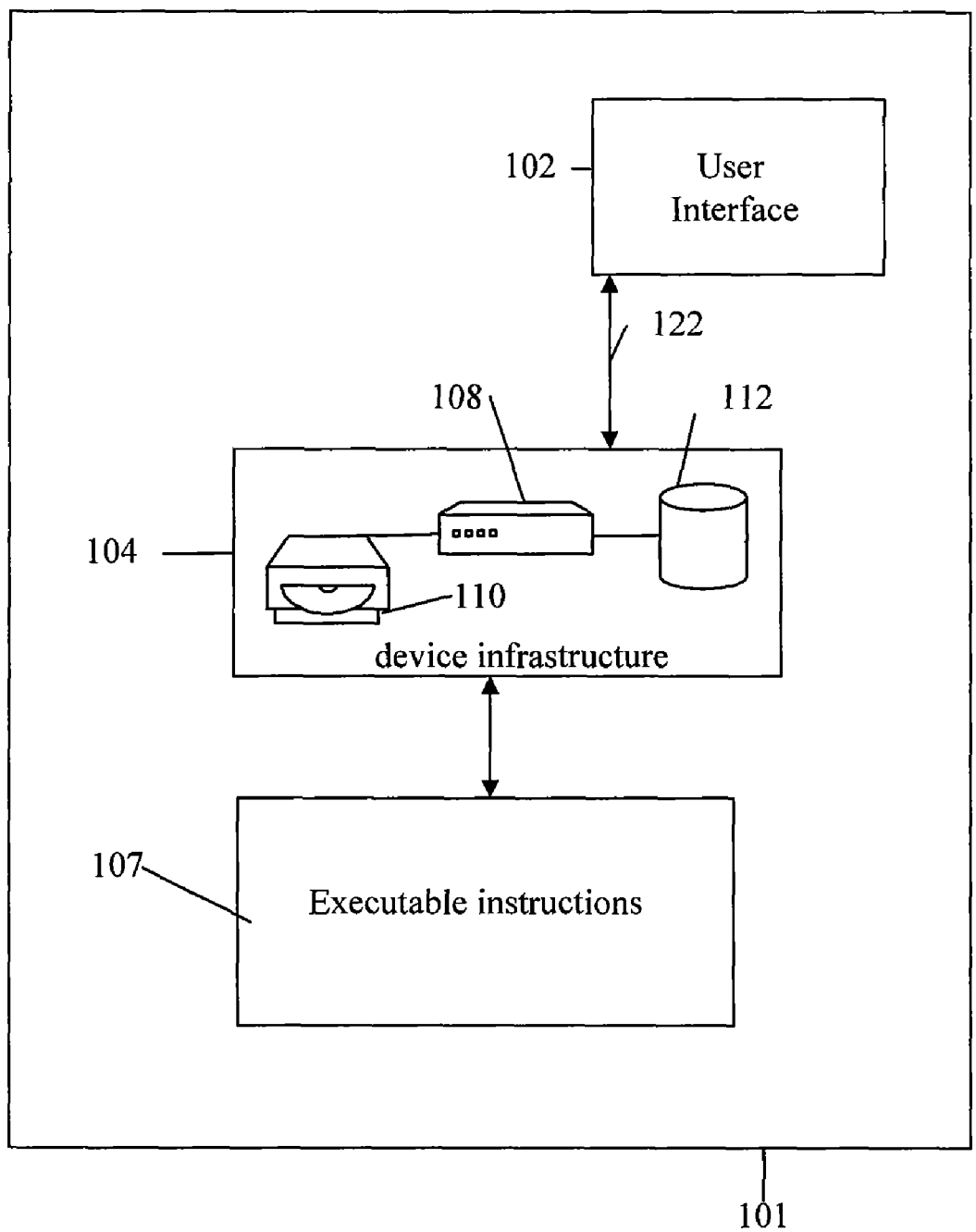
FIG. 8 shows an example embodiment of a computing system item design environment of FIG. 5.

Referring to FIG. 8, a computing device 101 of the reflectance engine 30 can have a user interface 102, coupled to a device infrastructure 104 by connection 122, to interact with a item designer (not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 8, operation of the device 101 is facilitated by the device infrastructure 104. The device infrastructure 104 includes one or more computer processors 108 and can include an associated memory 112 (e.g. a random access memory). The computer processor 108 facilitates performance of the device 101 configured for the intended task (e.g. of the respective module(s) of the reflectance engine 30) through operation of the user interface 102 and other application programs/hardware 107 (e.g. modules 32, 34, 38) of the device 101 by executing task related instructions. These task related instructions can be provided by an operating system, and/or software applications 107 located in the memory 112, and/or by operability that is configured into the electronic/digital circuitry of the processor(s) 108 designed to perform the specific task(s). Further, it is recognized that the device infrastructure 104 can include a computer readable storage medium 110 coupled to the processor 108 for providing instructions to the processor 108 and/or to load/update the instructions 107. The computer readable medium 110 can include hardware and/or software such as, by way of example only, magnetic disks, magnetic tape, optically readable medium such as CD/DVD ROMS, and memory cards. In each case, the computer readable medium 10 may take the form of a small disk, floppy diskette, cassette, hard disk drive, solid-state memory card, or RAM provided in the memory module 112. It should be noted that the above listed example computer readable mediums 110 can be used either alone or in combination.

Further, it is recognized that the computing device 101 can include the executable applications 107 comprising code or machine readable instructions for implementing predetermined functions/operations including those of an operating system and the reflectance engine 30 modules, for example. The processor 108 as used herein is a configured device and/or set of machine-readable instructions for performing operations as described by example above. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the reflectance engine 30 (e.g. modules) may be implemented in hardware, software or a combination of both. Accordingly, the use of a processor 108 as a device and/or as a set of machine-readable instructions is hereafter referred to generically as a processor/module for sake of simplicity. Further, it is recognised that the reflectance engine 30 can include one or more of the computing devices 101 (comprising hardware and/or software) for implementing the modules, as desired. Further, it is recognised that the functionality of the modules 32,34,38 and the lookup table 36 can be as described above, can be combined and/or can be further subdivided, as desired. It is also recognised that the reflectance values Rm of the stock material can be supplied by the image capture device 25 to the input module 32 and/or can be calculated by the input module 32 from appropriate data included in the reference image 26 provided by the image capture device 25 to the input module 32, as desired.

We claim:

1. A system for determining a plurality of reflectance values for an item design representing a physical item having at least one area of interest on a surface of the physical item for containing critical data and a background feature positioned on the surface, the physical item suitable for positioning in a digital image capturing device, the system comprising:
an input module configured for receiving one or more material reflectance values of a substrate for providing said surface and design parameters for said background feature, the design parameters including a color and a print density of said background feature;
a memory configured for storing a plurality of color reflectance values assigned to a corresponding plurality of selected combinations of specified design parameters;
a look-up module configured for determining from the memory one or more color reflectance values having the specified design parameters matching the design parameters for said background feature;
a combination module configured for combining the one or more material reflectance values with the corresponding one or more color reflectance values to produce resultant one or more design reflectance values representative of the reflectance of physical item when having the background feature positioned on said surface of the substrate;
wherein the one or more design reflectance values of the item design are for use in determining whether the design parameters would produce the physical item having an acceptable digital image when processed by the digital image capturing device.

2. The system of claim 1 further comprising a comparison module configured for comparing the one or more design reflectance values with a specified reflectance threshold in order to determine if the one or more design reflectance values satisfy said specified reflectance threshold.

3. The system of claim 2, wherein the stock material is selected from the group comprising paper and plastic.

4. The system of claim 2, wherein the design parameters define a plurality of background features.

5. The system of claim 2, wherein respective ones of the determined color reflectance values are assigned to a corresponding plurality of portions comprising a representative surface of a design image.

6. The system of claim 5, the comparison module further configured to provide a display of the design image on a user interface, the display indicating whether each of the plurality of portions having their design reflectance value as satisfying the reflectance threshold.

7. The system of claim 2, the comparison module further configured to change the print density of the received design parameters in order to make the design reflectance values satisfy the reflectance threshold.

8. The system of claim 3, wherein the physical item is selected from the group comprising: a check; a form; a coupon; a loyalty card; a debit card; and a credit card.

9. The system of claim 8, wherein the background feature is defined by the design parameters as overlapping the area of interest for containing critical data.

10. The system of claim 9, wherein the critical data is configured for positioning on the surface during manufacture of the physical item or is configured for positioning on the surface when the physical item is used by a user.

11. A method for determining a plurality of reflectance values for an item design representing a physical item having at least one area of interest on a surface of the physical item for containing critical data and a background feature positioned on the surface, the physical item suitable for positioning in a digital image capturing device, the method comprising:
- receiving one or more material reflectance values of a substrate for providing said surface and design parameters for said background feature, the design parameters including a color and a print density of said background feature;
- accessing a plurality of color reflectance values assigned to a corresponding plurality of selected combinations of specified design parameters;
- determining one or more color reflectance values having the specified design parameters matching the design parameters for said background feature;
- combining the one or more material reflectance values with the corresponding one or more color reflectance values to produce resultant one or more design reflectance values representative of the reflectance of physical item when having the background feature positioned on said surface of the substrate;
- wherein the one or more design reflectance values of the item design are for use in determining whether the design parameters would produce the physical item having an acceptable digital image when processed by the digital image capturing device.

12. The method of claim 11 further comprising comparing the one or more design reflectance values with a specified reflectance threshold in order to determine if the one or more design reflectance values satisfy said specified reflectance threshold.

13. The method of claim 12, wherein the stock material is selected from the group comprising paper and plastic.

14. The method of claim 12, wherein the design parameters define a plurality of background features.

15. The method of claim 12, wherein respective ones of the determined color reflectance values are assigned to a corresponding plurality of portions comprising a representative surface of a design image.

16. The method of claim 15 further comprising providing a display of the design image on a user interface, the display indicating whether each of the plurality of portions having their design reflectance value as satisfying the reflectance threshold.

17. The method of claim 12 further comprising changing the print density of the received design parameters in order to make the design reflectance values satisfy the reflectance threshold.

18. The method of claim 13, wherein the physical item is selected from the group comprising: a check; a form; a coupon; a loyalty card; a debit card; and a credit card.

19. The method of claim 18, wherein the background feature is defined by the design parameters as overlapping the area of interest for containing critical data.

20. The method of claim 19, wherein the critical data is configured for positioning on the surface during manufacture of the physical item or is configured for positioning on the surface when the physical item is used by a user.

21. The method of claim 11 further comprising the step of modifying selected ones of the assigned colour reflectance values and the material reflectance values using an adjustment factor based on the reflectance values of adjacent pixels of a reflectance map.

* * * * *